United States Patent
Hernandez

(10) Patent No.: US 7,489,626 B2
(45) Date of Patent: Feb. 10, 2009

(54) METHOD OF USING CABLE TEST TO MODIFY TEAMING FAILOVER ALGORITHM

(75) Inventor: Hendrich M. Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 527 days.

(21) Appl. No.: 11/058,929

(22) Filed: Feb. 16, 2005

(65) Prior Publication Data

US 2006/0182439 A1  Aug. 17, 2006

(51) Int. Cl.
*H04L 12/28* (2006.01)

(52) U.S. Cl. .............. 370/225; 370/241.1; 370/252

(58) Field of Classification Search ........... 370/248, 370/352, 235, 225, 241.1; 702/66; 712/11
See application file for complete search history.

(56) References Cited

U.S. PATENT DOCUMENTS

| | | | |
|---|---|---|---|
| 6,195,614 B1 * | 2/2001 | Kochan | 702/66 |
| 6,229,538 B1 | 5/2001 | McIntyre et al. | 345/349 |
| 6,272,113 B1 * | 8/2001 | McIntyre et al. | 370/248 |
| 6,295,276 B1 | 9/2001 | Datta et al. | 370/218 |
| 6,381,218 B1 | 4/2002 | McIntyre et al. | 370/245 |
| 6,493,341 B1 | 12/2002 | Datta et al. | 370/392 |
| 6,563,816 B1 * | 5/2003 | Nodoushani et al. | 370/352 |
| 7,263,597 B2 * | 8/2007 | Everdell et al. | 712/11 |
| 7,349,340 B2 * | 3/2008 | Sahai et al. | 370/235 |

\* cited by examiner

*Primary Examiner*—Andrew Lee
(74) *Attorney, Agent, or Firm*—Baker Botts L.L.P.

(57) ABSTRACT

A method of using cable test to modify teaming failover algorithm is disclosed. In accordance with one embodiment, a method of causing team member failover based on channel characteristics of a channel in an information handling system includes testing the channel of at least one of the team members in the information handling system. The method further includes comparing the channel characteristics of the team member to a minimum level of channel characteristics. The method further includes placing the team member into a standby mode such that the team member fails-over regardless of a link status of the channel, based on the comparison.

20 Claims, 3 Drawing Sheets

METHOD OF USING CABLE TEST TO MODIFY TEAMING FAILOVER ALGORITHM

TECHNICAL FIELD

The present disclosure relates generally to information handling systems and, more particularly, to a method of using cable test to modify teaming failover algorithm.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including storage products and servers, typically have a plurality of ports or slots able to receive adapter cards. The adapter cards generally provide additional functionality to the system. Usually, the adapter cards are controlled by a single controller such as a LAN-on-motherboard (LOM). Typically, the LOM is an embedded chip on the motherboard with physical devices (PHY) including an optical time domain reflectometer (OTDR)/time domain reflectometer (TDR) and a medial access controller.

A network interface card (NIC) is one type of adapter card that is used to permit the system to interconnect or link with various devices outside the system. Because each NIC has a limited bandwidth, the system will use a teaming software to allow two or more cards to function as a single virtual device. Teaming of NICs generally provides for additional bandwidth, load balancing and failover redundancy the team. In some instances, as many as eight NICs are grouped as a single team using teaming software and controlled via the LOM.

Whether coupled as a member of a team or individually, each NIC generally establishes a physical connection or link to an external device. Typically, an optical fiber or an eight-conductor data cable such as a CAT-6 wire is used to establish the link. Because reliable data transmission at high speeds are required over these connections such as 1.0 gigabits per second, each link must meet or exceed a minimum level of channel characteristics.

At present, connection tests generally are limited to link status. Because link status is typically based on whether a single pair of wires is connected and does not check all connections or the quality of the transmission of all connections. Transmission errors and connection quality can be below the minimum level of channel characteristics even though the link is established as verified by the link status.

SUMMARY

In accordance with one embodiment of the present disclosure, a method of causing team member failover based on channel characteristics of a channel in an information handling system includes testing the channel of at least one of the team members in the information handling system. The method further includes comparing the channel characteristics of the team member to a minimum level of channel characteristics. The method further includes placing the team member into a standby mode such that the team member fails-over regardless of a link status of the channel, based on the comparison.

In a further embodiment, an information handling system includes a processor coupled to a processor bus and a memory coupled to the processor bus. The memory communicatively coupled with the processor. The information handling system further comprising a controller communicatively coupled to the processor bus, the controller operably interacting with one or more interfaces. The one or more interfaces operably interconnected to each other using a teaming algorithm to form team members. The teaming algorithm capable of being stored in the memory and executed by the processor. The information handling system further comprising a channel testing mechanism forming a part of the information handling system. The channel testing mechanism communicatively coupled to controller. The channel testing mechanism operable to obtain channel characteristics of a channel of at least one of the team members. The teaming algorithm operable to compare the channel characteristics to a minimum level of channel characteristics such that, based on the comparison, the team member is placed into a standby mode such that the team member fails-over regardless of a link status of the channel.

In accordance with a further embodiment of the present disclosure, a computer-readable medium having computer-executable instructions for causing failover of a team member based on channel characteristics of a channel in an information handling system including instructions for initiating a test of the channel of at least one of the team members in the information handling system. The computer-readable medium further including instructions for comparing the channel characteristics of the team member to a minimum level of channel characteristics. The computer-readable medium further including instructions for placing the team member into a standby mode such that the team member fails-over regardless of a link status of the channel based on the comparison.

One technical advantage of some embodiments of the present disclosure is the ability for the teaming algorithm to make more intelligent failover decisions. Because the failover decision of the algorithm allows for testing of channel characteristics without regard to link status, the decision to failover a team member can be based on channel characteristics such as transmission errors. Thus, the teaming algorithm can balance the team load from below standard members to those members meeting or exceeding the minimum level of channel characteristics.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
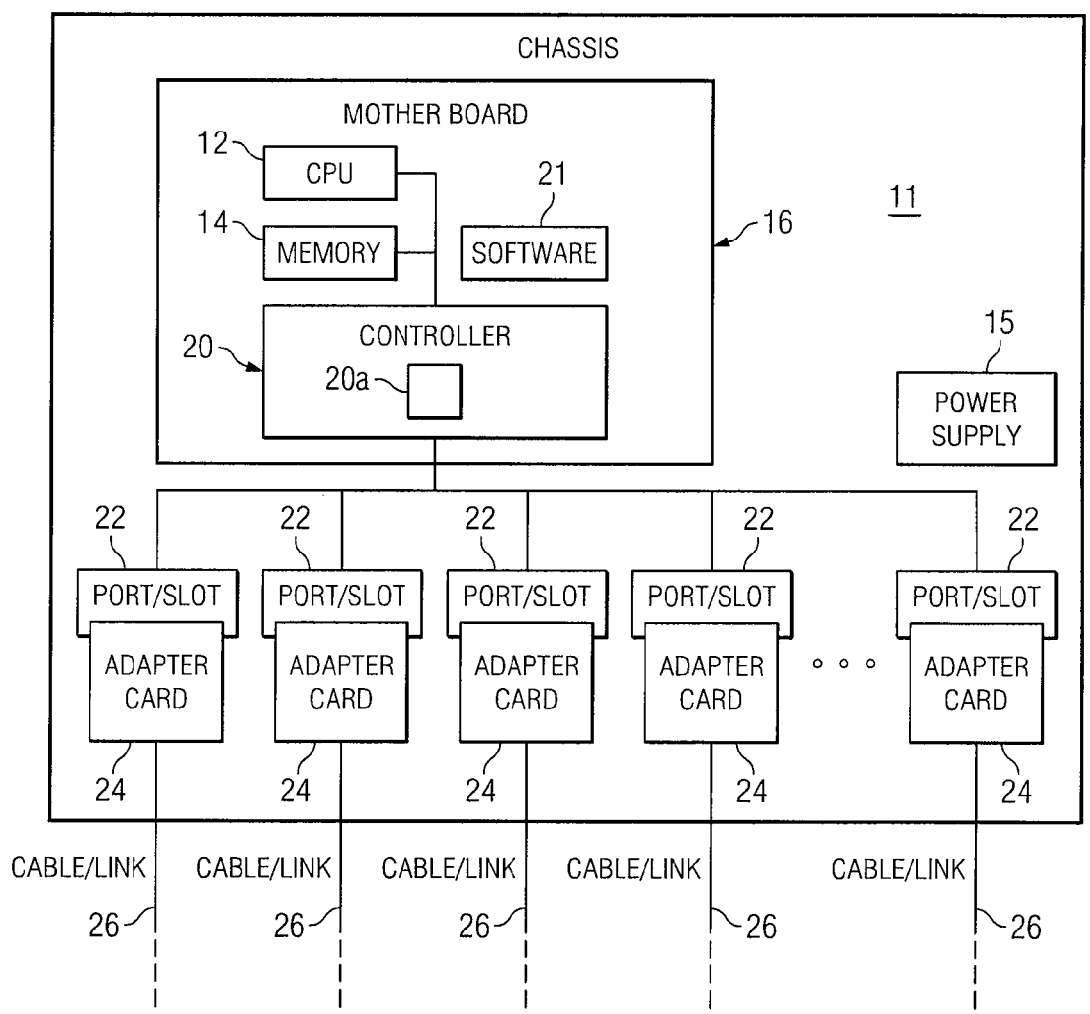
FIG. 1 is a block diagram showing a server, according to teachings of the present disclosure.
Figure 2:
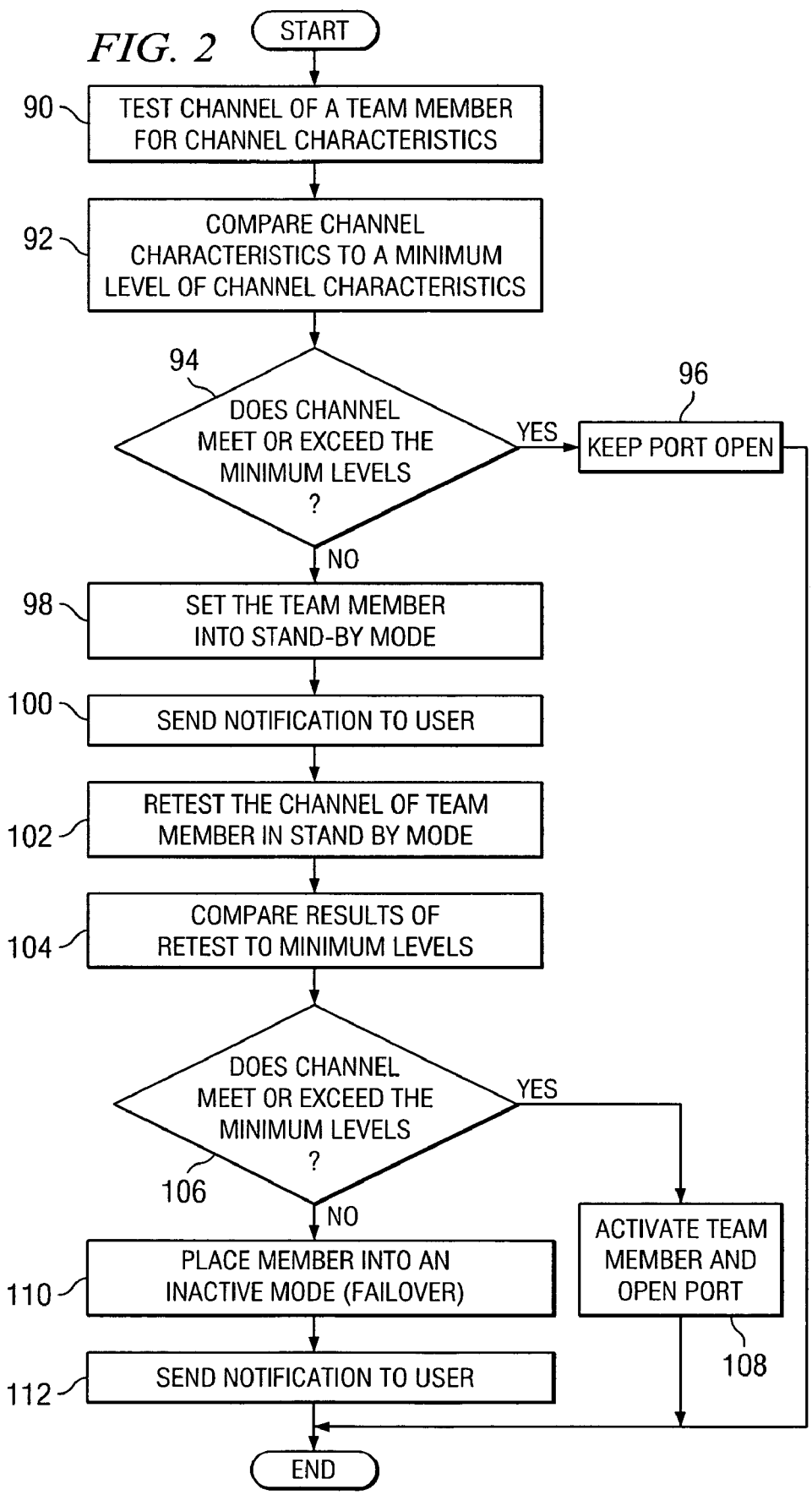
FIG. 2 is a flowchart of a method of causing team member failover based on channel characteristics of a channel in the in information handling system, according to teachings of the present disclosure.
Figure 3:
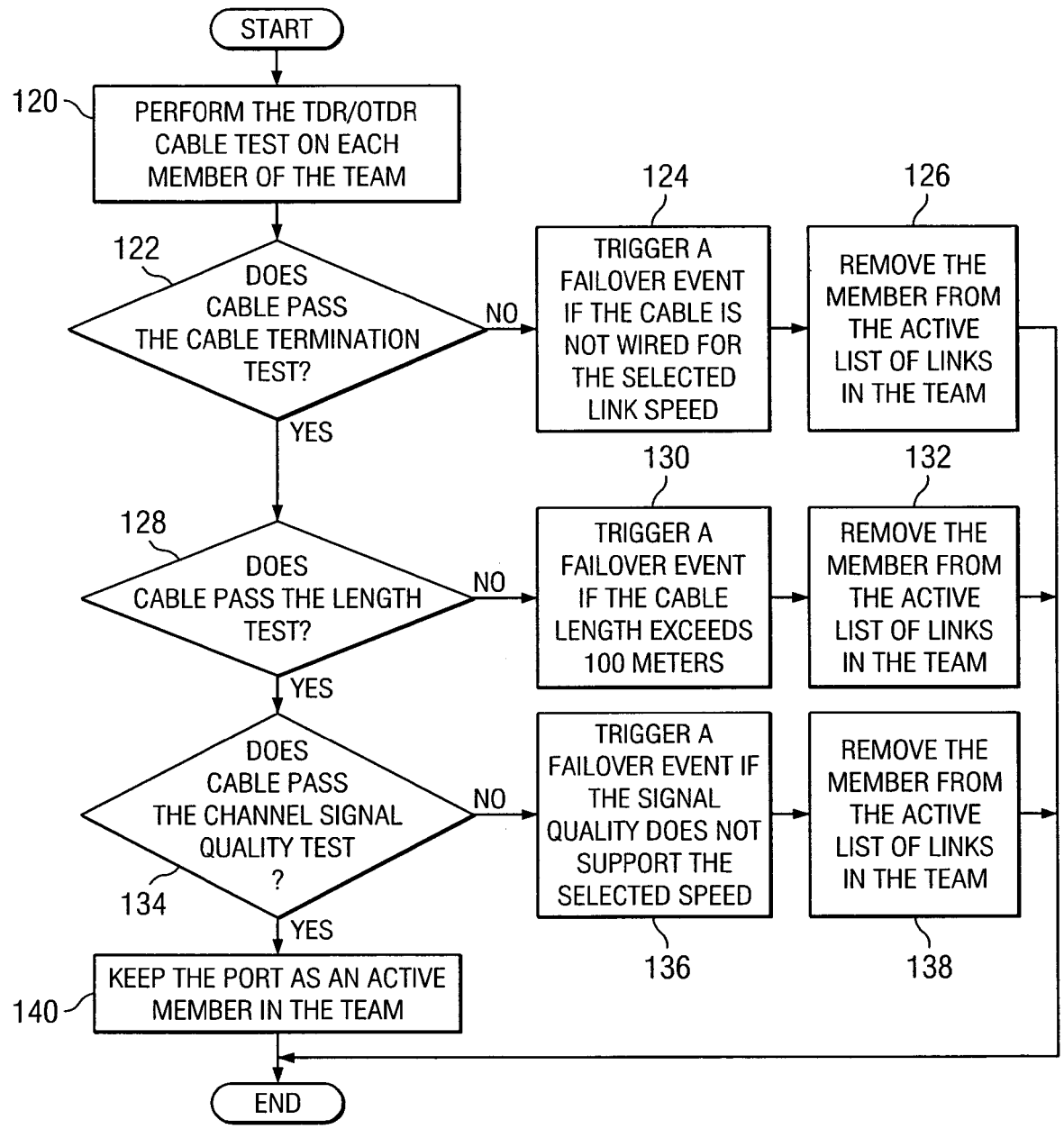
FIG. 3 is a flowchart of one embodiment of a method of testing each team member for triggering a failover event in the information handling system, according to teachings of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a block diagram of an example embodiment of an information handling system such as server 10 including adapter cards 24. In one example embodiment, information handling system includes server 10 that may form a part of a component rack system (not expressly shown). Typically, server 10 includes an enclosure or chassis 11, one or more power supply 15, printed circuit board such as motherboard 16 and a plurality of slots or ports 22. Server 10 generally couples to other computer components such as keyboards, video displays and pointing devices (not expressly shown).

Typically, server 10 includes one or more power supply 15 such that a redundant power source may be provided. Power supply 15 supplies a power supply output such as an electrical voltage to motherboard 16 and other components of server 10 such as each adapter card 24 coupled at respective ports 22.

Information handling system including server 10 typically includes one or more microprocessors such as a central processing unit (CPU) 12. CPU 12 may include a processor for handling integer operations and a coprocessor for handling floating point operations. CPU 12 preferably couple to memory 14 via a Northbridge chipset (not expressly shown).

Software 21 including teaming algorithms may preferably be loaded into memory 14 and executed by CPU 12. Teaming algorithm typically allows for two or more adapter cards 24 coupled at respective ports 22 to function as a single larger virtual device. As such, each member of the team may be controlled via controller 20.

In general, the efficiency and speed of the transmissions from server 10 to the other devices depends on the algorithms, switching fabric and the processor. In addition, the complexity at which the transmission operates is based on the layer of the transmission. Typically, teaming algorithms operate in the open systems interconnection (OSI) design framework using a layer 2 design. Using layer 2, the teaming algorithm identifies other devices according to their permanently assigned hardware device physical network address. As such, the teaming algorithm may be referred to as a layer 2 teaming algorithm.

Controller 20 preferably couples to memory 14 and CPU 12. Controller 20 typically provides and enables server 10 to communicate with a communication network (not expressly shown) such as an Ethernet network. The communication network may also include a local area network (LAN), wide area network (WAN), Internet, Intranet, wireless broadband or the like.

Controller 20 is typically used to form a network interface for communicating with other information handling systems (not expressly shown) coupled to the communication network. In some embodiments, controller 20 is a chip embedded on the motherboard such as a LAN-on-motherboard (LOM) chip. Generally, controller 20 includes a time domain reflectometer (TDR)/optical time domain reflectometer (OTDR) tester 20a that is able to perform cable test on each channel to detect flaws and problems in wires, cabling, and fiber optics. The test generally includes sending a signal down the cable and measuring the time it takes for the signal to return or reflect. Generally the reflection is a then measured and divided by two, the reflection is indicative of a flaw in the cable.

Adapter cards 24 that may form part of a team are typically coupled at respective ports 22 may allow for server 10 to interface with other devices (not expressly shown) via cable 26, commonly referred to as a link. Cable 26 may be formed using fiber optic connections and/or wire connections such as eight conductor copper wire such as CAT 6 cable. Depending on the required transmission level, different cables may be selected for different applications. Thus, based on the required channel characteristics for the link, each cable 26 from a respective adapter card 22 must be established for data transmission at particular speeds and quality.

As such, each link has a bandwidth channel, commonly referred to as channel, preferably meets or exceeds a minimum level of channel characteristics. For example, channel characteristics typically include noise level of the channel, poor termination of the wire, number of transmission errors, cable termination problems and combinations of these characteristics. In one instant, if there are too many transmission errors, cable 26 may be determined to fall below the minimum level such that the link does not support gigabit transmission speeds.

In forming a team using the teaming algorithm, the team usually sets a minimum level of channel characteristics for each bandwidth channel of team members. Thus, the teaming algorithm can monitor the channel characteristics for each team member and determine whether the channel characteristics of the member meets or exceed the minimum level. Based on this determination, the algorithm can inactive below standard equipment such as the interfaces and may provide notice to users about team members.

FIG. 2 is a flowchart of a method of causing team member failover based on channel characteristics of a channel. At block 90, a channel of a team member is tested for channel characteristics. Typically, the test is performed at regular intervals for monitoring the links of each team member.

The testing intervals are usually set to an initial default time of testing once every minute. However, in some embodiments, the intervals are user configurable such that the test may be performed at any interval. For example, a user may be able to select or configure testing times ranging from one minute to five minutes.

OTDR/TDR tester 20*a* is preferably used to perform the test of the cable 26. In some embodiments, all of the channels of the team are tested at this time.

Channel characteristics for each team member cable 26 are compared to a minimum level of channel characteristics, as shown at block 92. The comparison of channel characteristics is made independent of the link status of the channel. At block 94, a determination is made whether the channel characteristics meet or exceed the minimum level. If the channel characteristics meet or exceed the minimum level, the team member is kept active such that the port stays open or available for communications, as shown at block 96.

However, if the channel does not meet the minimum level, the team member is placed into a standby mode as shown at block 98. Being placed into the standby mode, the team member is temporarily not part of the team as it is inactive to communications. As such, the load of the standby team member is shifted to other team members.

In some embodiments, an alert notification such as a warning message or notice is set a user as shown at block 100.

Because the team member has been placed into a standby mode, the method retest the channel of the team member as shown at block 102. At block 104, the results of the retest are compared to the minimum levels of channel characteristics. At block 106, a determination is made whether the retested channel characteristics meet or exceed the minimum level. If the retested channel characteristics meet or exceed the minimum level, the team member is activated such that the port reopens or is made available for communications, as shown at block 108.

However, if retested channel characteristics do not meet or exceed the minimum levels, the team member may be placed into an inactive or failover mode as shown at block 110. In the failover mode, the workload of the team member is distributed to other active members of the team.

In some embodiments, the results of the channel characteristics is stored such as in memory 14. Generally, the most recent results may be saved such that a user may access the results for troubleshooting errors.

However, the saved results may also allow for repeated testing before placing a team member into an inactive or failover mode such as the team member exceeded the allowable failure rate. For example, the algorithm may only place a team member into a failover mode if the member does not meet or exceed the minimum level for three consecutive test. Thus, the number of times the team member failed the test may also be tracked and stored.

In some embodiments, an error notification such as a error message or notice is set a user as shown at block 112. Typically, the error sent to the user indicates that a team member has timed out such that user intervention is required.

FIG. 3 is a flowchart of one embodiment of a method of testing each team member for triggering a failover event in the information handling system. At block 120, a test of team member channels is performed using OTDR/TDR tester 20*a*. These results are then compared to minimum levels of channel characteristics.

One team member test channel characteristic includes a cable termination test. As shown at block 122, a determination is made whether cable 26 of respective adaptor card 24 passes a minimum cable termination test. If cable 26 does not pass, a failover event may be triggered as shown at block 124. Cable termination typically test whether the cable is wired for the selected link speed. If triggered, cable 26 may be removed from the active team member list of links in the team as shown at block 126.

Another team member channel characteristic test includes a cable length check. As shown at block 128, a determination is made whether cable 26 of respective adaptor card 24 passes a cable length check. If cable 26 does not pass, a failover event may be triggered as shown at block 130. Cable length check typically fails when the cable length exceeds one hundred meters. If triggered, cable 26 may be removed from the active team member list of links in the team as shown at block 132.

Another team member channel characteristic test includes a cable channel signal quality test. As shown at block 134, a determination is made whether cable 26 of respective adaptor card 24 passes a cable channel signal quality test. If cable 26 does not pass, a failover event may be triggered as shown at block 136. Cable channel signal quality typically fails when the signal quality does not support the selected speed of the link. If triggered, cable 26 may be removed from the active team member list of links in the team as shown at block 138.

If the team member passes all of the channel characteristics test, the team member port is kept as an active port in the team as shown at block 140.

Although the disclosed embodiments have been described in detail, it should be understood that various changes, substitutions and alterations can be made to the embodiments without departing from their spirit and scope.

What is claimed is:

1. A method of causing team member failover based on channel characteristics of a channel in an information handling system including a plurality of team members, comprising:
   testing a channel of one of the team members in the information handling system, the channel currently connecting the team member and a device and allowing communications via the channel between the team member and the device;
   wherein testing the connected channel determines channel characteristics regarding the physical quality of the connected channel;
   comparing the channel characteristics of the team member to a minimum level of channel characteristics and identifying the team member as a below standard team member having channel characteristics below the minimum level of channel characteristics; and
   automatically placing the below standard team member into a standby mode such that the team member failsover to one or more other team members regardless of the channel being currently connected and allowing communications between the below standard team member and the device via the channel.

2. The method of claim 1, wherein the test of the channel further comprises performing at least one of an optical time domain reflectometer (OTDR) and a time domain reflectometer (TDR) test of the channel.

3. The method of claim 1, further comprising:
   retesting the channel placed into standby mode;
   comparing the results of the retest to the minimum level of channel characteristics; and
   based on the retest comparison, placing the team member into an inactive mode such that the team member failsover to one or more other team members.

4. method of claim 3, further comprising sending a notice to a user that the team member requires user intervention based on placing the team member into the inactive mode.

5. method of claim 1, wherein the testing of the channel further comprises performing the test of the channel at periodic intervals.

6. The method of claim 1, wherein the periodic intervals comprise a user configurable setting for performing the test of the channel.

7. The method of claim 6, wherein the configurable setting includes a default setting of testing the channel once every minute.

8. The method of claim 1, wherein the channel characteristics comprise characteristics selected from a group of consisting of noise level, poor termination, transmission errors, termination problems and any combination of the above.

9. An information handling system, comprising:
- a processor coupled to a processor bus;
- a memory coupled to the processor bus, the memory communicatively coupled with the processor;
- a controller communicatively coupled to the processor bus, the controller operably interacting with one or more interfaces;
- the one or more interfaces operably interconnected to each other using a teaming algorithm to form team members, the teaming algorithm capable of being stored in the memory and executed by the processor;
- a channel testing mechanism forming a part of the information handling system, the channel testing mechanism communicatively coupled to controller;
- the channel testing mechanism operable to obtain channel characteristics regarding the physical quality of a channel of one of the team members, the channel currently connecting the team member and a device and allowing communications between the team member and the device via the channel; and
- the teaming algorithm operable to compare the channel characteristics to a minimum level of channel characteristics and to identify the team member as a below standard team member having channel characteristics below the minimum level of channel characteristics, whereby the below standard team member is automatically placed into a standby mode such that the team member fails-over to one or more other team members regardless of the channel being connected and allowing communications between the below standard team member and the device via the channel.

10. The information handling system of claim 9, wherein the channel testing mechanism comprises at least one of an optical time domain reflectometer (OTDR) and a time domain reflectometer (TDR).

11. The information handling system of claim 9, wherein at least one of the two or more interfaces comprises a network interface.

12. The information handling system of claim 9, wherein the controller comprises a local area network (LAN) controller.

13. The information handling system of claim 9, wherein the channel characteristics comprise characteristics selected from a group of consisting of noise level, poor termination, transmission errors, termination problems and any combination of the above.

14. A computer-readable medium having computer-executable instructions for causing failover of a team member based on channel characteristics of a channel in an information handling system, comprising:
- instructions for initiating a test of the channel of the team member in the information handling system, the channel currently connecting the team member and a device and allowing communications between the team member and the device via the channel;
- wherein testing the connected channel determines channel characteristics regarding the physical quality of the connected channel;
- instructions for comparing the channel characteristics of the team member to a minimum level of channel characteristics and identifying the team member as a below standard team member having channel characteristics below the minimum level of channel characteristics; and
- instructions for automatically placing the below standard team member into a standby mode such that the below standard team member fails-over to one or more other team members regardless of the channel being connected and allowing communications between the below standard team member and the device via the channel.

15. The computer-readable medium of claim 14, further comprising instructions for sending a notice to a user that the below standard team member is placed in standby mode.

16. The computer-readable medium of claim 14, further comprising:
- instructions for retesting the channel placed into standby mode;
- instructions for comparing the results of the retest to the minimum level of channel characteristics; and
- instructions for placing the team member into an inactive mode such that the team member fails-over to one or more other team members based on the retest comparison.

17. The computer-readable medium of claim 16, further comprising instructions for sending a notice to a user that the team member requires user intervention based on placing the team member into the inactive mode.

18. The computer-readable medium of claim 14, further comprising instructions for initiating the test of the channel at periodic intervals.

19. The computer-readable medium of claim 18, further comprising instructions for allowing users to configure the periodic intervals.

20. The computer-readable medium of claim 14, wherein the periodic intervals further comprises instructions for performing the test of the channels at prescribed default intervals.

* * * * *